Nov. 7, 1972  H. P. FURTH ET AL  3,702,163
DEVICE FOR COMPRESSION HEATING OF TOKAMAK DISCHARGES
Filed April 15, 1970  3 Sheets-Sheet 1

INVENTORS.
HAROLD P. FURTH
BY SHOICHI YOSHIKAWA

Nov. 7, 1972   H. P. FURTH ET AL   3,702,163
DEVICE FOR COMPRESSION HEATING OF TOKAMAK DISCHARGES
Filed April 15, 1970   3 Sheets-Sheet 3

INVENTORS.
HAROLD P. FURTH
BY SHOICHI YOSHIKAWA

United States Patent Office 3,702,163
Patented Nov. 7, 1972

3,702,163
DEVICE FOR COMPRESSION HEATING OF TOKAMAK DISCHARGES
Harold P. Furth and Shoichi Yoshikawa, Princeton, N.J., assignors to the United States of America as represented by the United States Atomic Energy Commission
Filed Apr. 15, 1970, Ser. No. 28,890
Int. Cl. G21b 1/00
U.S. Cl. 176—3
6 Claims

ABSTRACT OF THE DISCLOSURE

An apparatus is disclosed for heating and compressing a toroidal plasma column. The apparatus comprises a toroidal evacuated container, having annular toroidal and poloidal coils centered on the major axis. Interacting fields produce an inward compression of the plasma column toward the major axis characterized by a reduction in the major and minor radii of the plasma column.

BACKGROUND OF THE INVENTION

In the field of plasma physics, a need exists for magnetically confining and heating a plasma in a vacuum chamber. Various proposals have been made and used to accomplish such confinement and heating, such as those that employ plasma "self-focusing" proposed by Bennett in 1934. This effect, which is described on pages 22–23 of "Project Sherwood—The U.S. Program in Controlled Fusion," by Amasa S. Bishop, Addison-Wesley Publishing Company, Inc., 1958, employs a plasma current that "pinches" the plasma in an encircling magnetic field around the plasma column, and heats the plasma at the center of a vacuum enclosure therefor. Various actual devices for producing such currents, comprise the Model C Stellarator at Princeton University and modifications thereof, which employ the combination of a toroidal magnetic field $B_t$ and an induced plasma current for producing a stable equilibrium. These and other such devices employing a $B_t$ field and an ohmically induced plasma current, are described in the co-pending application entitled "Air-Core Tokamak," S.N. 11,994, filed Feb. 17, 1970, which is assigned to the assignee of this application by the co-inventor of this application, and the publications mentioned therein, all of which are incorporated by reference herein.

One of the devices described in the above-mentioned publications, referred to in the art as the T–3 tokamak, contemplates a toroidal $B_t$ field and an ohmically induced plasma current for producing a well-confined hot plasma of $n\sim3\cdot10^{13}$ cm.$^{-3}$, $T_e\sim1$ kev., and $T_i\sim0.5$ kev., where $n$=the number of plasma particles, and $T_e$ and $T_i$=the electron and ion temperatures, respectively. It seems difficult, however, to extend these parameters to the desired next stage, i.e., $n\sim3\cdot10^{14}$ cm.$^{-3}$, $T_e$, $T_i\sim5$ kev., by simply constructing ordinary discharge-heated tokamaks of a bigger size or stronger magnetic field. The limiting problems, for example, comprise parameters incompatible with the existence of anomalous resistivity, and the ordinary ohmic heating proceeding so slowly that even simple hydrogenic bremsstrahlung prevents $\beta_p$–1 for machines with more than $\sim10^6$ guass cm. where $\beta_p$=the ratio of the outward plasma pressure P and the inward magnetic field pressure $B_p^2/8\pi$ of the poloidal magnetic field component. Plasma contamination is also more severe in high-power-level tokamak discharges, which enhance the hydrogenic bremsstrahlung with high-z bremsstrahlung and excitation radiation. Skin times at higher $T_e$ and larger size become long enough to produce a persistence of MHD-unstable field configurations. It is also advantageous to raise $T_i$ and $n$ for the purposes of controlled thermonuclear reactions.

SUMMARY OF THE INVENTION

This invention was made in the course of, or under a contract with the United States Atomic Energy Commission. This invention provides means for overcoming the heretofore known problems and shortcomings of the prior art devices for magnetically confining and heating a high-density plasma. To this end, this invention provides compression heating of the plasma. More particularly, in one embodiment, this invention provides a poloidal magnetic field configuration and apparatus, hereinafter referred to as a tokamak compressor, having a toroidal field coil, a toroidal vacuum container, and poloidal field coils for inducing a plasma current and providing an equilibrium $B_p$-field configuration for confining the plasma in a column and for compressing the plasma column and the magnetic confining field configuration in both minor and major radius to heat the plasma. With the proper selection of components, as described in more detail hereinafter, the desired plasma confinement and heating are achieved.

The above and further novel features and objects of several embodiments of this invention will appear more fully from the following description when read in connection with the accompanying drawings, and the novel features will be pointed out in the appended claims.

BRIEF DESCRIPTION OF THE DRAWINGS

In the drawings where like elements have like reference numbers:

FIG. 2a is a partial schematic drawing of the initial discharge stage of the system of this invention, e.g., for the plasma column of FIG. 1;

FIG. 2b is a partial schematic drawing of the precompression stage for the plasma column of FIG. 2a;

FIG. 2c is a partial schematic drawing of the post-compression stage of the plasma column of FIG. 2b;

BRIEF DESCRIPTION OF THE PREFERRED EMBODIMENT

This invention is useful in magnetically confining a plasma column having a wide variety of plasma particles therein, comprising electrons and ions of the same or different species. One species of ions, comprises deuterium nuclei alone, but ions of deuterium, tritium, or heavier particles, such as $He^3$ nuclei, may be used alone or in combination. Accordingly, this invention is useful for the wide variety of applications, over the wide range of plasma particle velocities, densities, confinement times, and plasma currents to which the previously employed controlled thermonuclear reactors, i.e., CTR devices, have been employed. In this regard, this invention is particularly useful in heating plasma columns having plasma currents therein, such as described in the above-mentioned co-pending application by the co-inventor of this application. As such, the invention described herein is an improvement over the invention described in that co-pending application.

Figure 1:
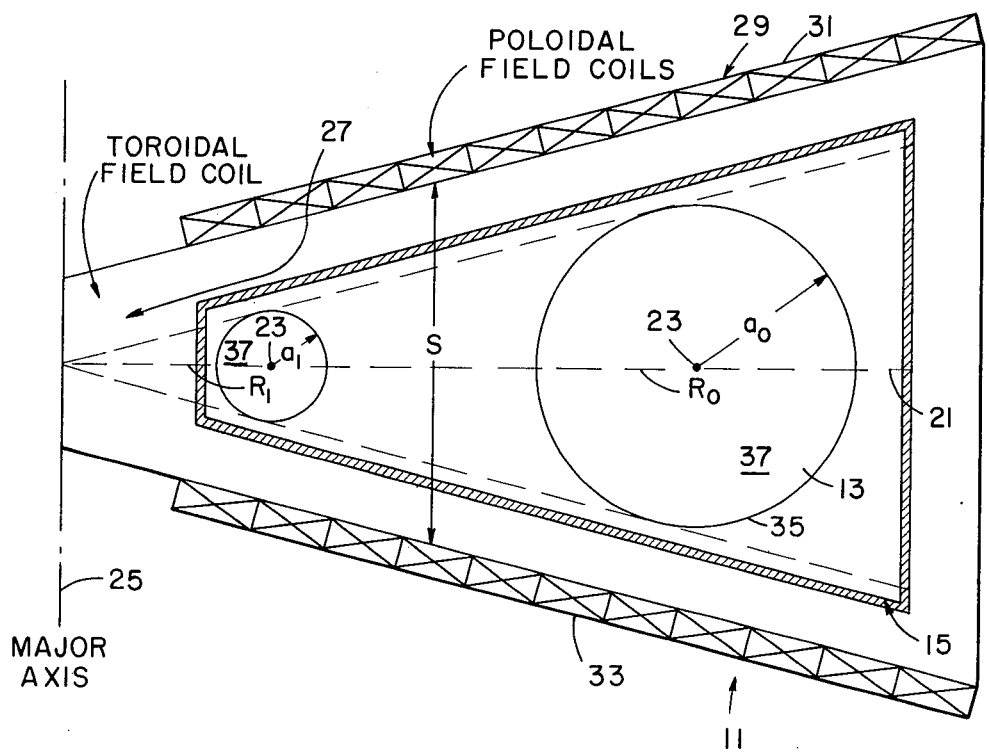
FIG. 1 is a partial cross section of one embodiment of the tokamak compressor of this invention.

Referrig now to FIG. 1, in one embodiment referred to as the Type-A compressor 11, this invention provides an endless, toroidal plasma column 13 in a toroidal vacuum container 15. To this end, a $B_t$ magnetic field 17 is produced along the entire circumference of the toroidal vacuum container 15; and this $B_t$ field is combined with an ordinary plasma current 19 in the plasma column 13, comparable to the plasma current provided in the apparatus of the abovementioned co-pending application, although a T–3 tokamak plasma column is likewise analogous. In accordance with this invention, this plasma column 13 is compressed along with the described combination of $B_t$ and plasma current fields. In this regard, both the plasma column 13 and the described confining magnetic field configuration are compressed in both minor radius $a$, and in major radius R, which is the radius in plane 21 of the major endless axis 23 of column 13 around major axis 25 at right angles to plane 21. The Type-A compression is characterized by keeping the torus aspect ratio $a/R$ constant. To this end, as described in more detail hereinafter, this invention provides a toroidal field coil 27, and a poloidal magnetic field producing means 29 having spaced apart coils 31 and 33 for inducing the desired plasma current, and also producing the required $B_p$ field to effect the compression in the major radius R of the plasma column 13. The desired compression in minor radius $a$ is effected by raising the toroidal magnetic field $B_t$.

In this regard if the radial compression factor of the plasma column 13 is:

$$C = \frac{a_0}{a_1}$$

the scaling laws for a slow compression ($\gamma = 5/3$) are given in the following table:

TABLE I.—TYPE-A COMPRESSOR SCALING

| | |
|---|---|
| Volume | $V \rightarrow C^{-3}$ |
| Plasma pressure | $p \rightarrow C^5$ |
| Density | $n \rightarrow C^3$ |
| Temperature | $T \rightarrow C^2$ |
| Toroidal field at fixed point | $B_t(R_o) \rightarrow C$ |
| Toroidal field at plasma axis | $B_t(R)$ |
| Current in toroidal field coil | $I_{tor} \rightarrow C$ |
| Poloidal field | $B_p \rightarrow C^2$ |
| Plasma current | $I \rightarrow C$ |
| Plasma $\beta_p$ | $\beta_p \rightarrow C$ |
| Plasma $\beta_t$ | $\beta_t \rightarrow C$ |
| Total magnetic energy | $W_{mag} \rightarrow C^2$ |
| Total plasma energy | $W_{plasma} \rightarrow C^2$ |
| Transform | $l = $ Constant |
| Aspect ratio | $\frac{a}{R} = $ Constant |

The plasma $\beta_t$ is the ratio of the plasma pressure P to the pressure of the toroidal magnetic field $B_t^2/8\pi$. The transform $l$ is the angle around the minor torus circumference traversed by a magnetic field line on the outer surface of the plasma column, when traversing once around the major circumference.

Parameters for two examples of the embodiment of FIG. 1 are given in the following table:

ing application, or the T–3 tokamak, with the same $R_o$ and $B_1(R_o)$:

$$W_{mag} \sim \int_{R_1}^{R_0} dR \, 2\pi R^2 \left(\frac{2a_o}{R_o}\right) \left(\frac{4I_{tor}^2}{8\pi R^2}\right) \sim \frac{2a_o}{R_o} I_{tor}^2 (R_o - R_1)$$

Moreover, there is no need in accordance with the apparatus of this invention, to provide either the iron core of the above-mentioned T–3 tokamak, or the air-core space inside $R_1$ in accordance with the apparatus of the above-mentioned co-pending application. Thus, in accordance with this invention, as will be understood in more detail from the following, the entire region of radius $R_1 - a_1$ is available for the cross section of the toroidal field coil 27. Also, as will be understood in more detail from the following, there is no DC power problem in the initial tokamak discharge phase, illustrated in FIG. 2a, because initially $$I_{tor}^2$$

is reduced by $C^{-2} \sim 1/10$ relative to the final values in the examples given in Table II. As for the secondary compression stage, illustrated in FIG. 2b, this is carried out in less than one L/R— time of the toroidal field coil, so that the DC power limitation only becomes a problem when seeking to crow-bar the compressed regime and maintain it for long periods of time, as discussed in more detail hereinafter.

In supplying the large required magnetic energies $W_{mag\,1}$ in reasonably short times there are two basic approaches, corresponding to the two examples given in Table II. For a small compressor in accordance with the embodiment shown in FIG. 1, a capacitor supplies the requirements of $W_{mag\,1} \sim 1$ MJ, with discharge times in the range of 1–10 msec. as is suitable for the typical plasma energy confinement time $\tau_E$ of a discharge of the given size. On the other hand, in an example of a large compressor, according to the embodiment of FIG. 1, the energy requirements are ~40 MJ, but the time scale is up to $\tau_E \sim 100$ msec., in which case the power requirement is 400 mw. This sort of power can be supplied by conventional motor generators with fly wheels, or auxiliary inductive energy storage.

The poloidal magnetic field producing means 29 of the embodiment of FIG. 1, comprises a set of coils 31 and 33 that induce an initial plasma current that matches the tangential component of the external $B_p$ field at the plasma boundary 35 during the compression of this invention. To this end, these coils also provide the proper average vertical component of the $B_p$ field to control the major plasma radius R. Advantageously, to this end the initial

TABLE II.—TYPE-A COMPRESSOR EXAMPLES

| Example I | | Example II | |
|---|---|---|---|
| $R_0 = 60$ cm | $R_1 = 20$ cm | $R_0 = 120$ cm | $R_1 = 40$ cm., major radius of plasma. |
| $a_0 = 15$ cm | $a_1 = 5$ cm | $a_0 = 30$ cm | $a_1 = 10$ cm., minor radius of plasma. |
| $B_{to}(R_o) = 8$ kg | $B_{t1}(R_o) = 25$ kg | $B_{to}(R_o) = 16$ kg | $B_{t1}(R_o) = 50$ kg., toroidal field at initial plasma major radius $R_o$. |
| $B_{to}(R_1) = 25$ kg | $B_{t1}(R_1) = 75$ kg | $B_{to}(R_1) = 50$ kg | $B_{t1}(R_1) = 150$ kg., toroidal field at initial plasma major radius. |
| $I_o = 50$ ka | $I_{k1} = 150$ ka | $I_o = 200$ ka | $I_1 = 600$ ka., plasma current. |
| $n_o = 10^{13}$ cm.$^{-3}$ | $n_1 = 3 \cdot 10^{14}$ cm.$^{-3}$ | $n_o = 10^{13}$ cm.$^{-3}$ | $n_1 = 3 \cdot 10^{14}$ cm.$^{-3}$, plasma density. |
| $T_{eo} = 0.3$ kev | $T_{e1} = 2.7$ kev | $T_{eo} = 1$ kev | $T_{e1} = 9$ kev., plasma electron temperature. |
| $T_{io} = 0.2$ kev | $T_{i1} = 1.8$ kev | $T_{io} = 0.5$ kev | $T_{i1} = 4.5$ kev., plasma ion temperature. |
| $\beta_{po} = 0.3$ | $\beta_{p1} = 1$ | $\beta_{po} = 0.3$ | $\beta_{p1} = 1$, ratio of plasma pressure to poloidal magnetic field pressure. |
| $W_{mag\,0}$ (before compression) = 0.1 mj. | $W_{mag\,1}$ (after compression) = 1 mj. | $W_{mag\,0} = 4$ mj. | $W_{mag\,1} = 40$ mj., toroidal energy content of magnetic field. |

Figure 2:
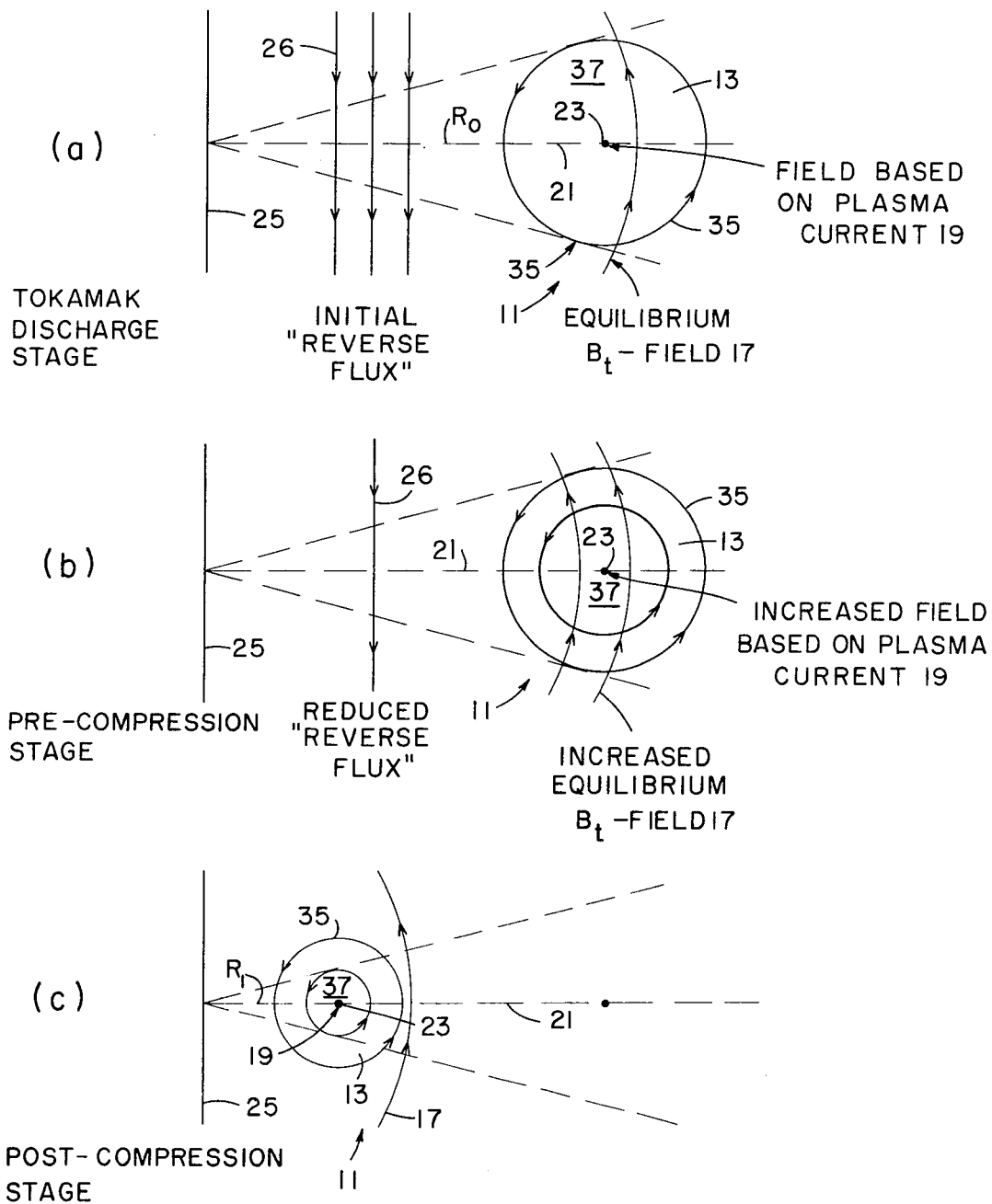

In understanding the embodiment of FIG. 1, several technical points deserve special comment. The elongated cross section of toroidal field coil 27 is not particularly awkward to construct, since such a coil can employ heavy machined copper bars similar to those employed in the toroidal field solenoid of the above-mentioned copending application. Also, the extra magnetic energy stored at small major radii R is surprisingly small, representing only a minor increment of the energy that would be stored in the apparatus of the above-mentioned co-pendpoloidal flux 26 links the plasma current discharge, as illustrated in FIG. 2a. The proper magnitude is provided so that there is only a little flux 26 left at the time just prior to compression. During compression, the remaining poloidal flux will be approximately conserved.

In operation the plasma column 13 has a large cross-sectional radius $a_0$ spaced at a first large radius $R_0$ from major axis 25 in plane 21, as shown in FIGS. 1 and 2a. Likewise, the endless axis 23 of column 13 has a first correspondingly large radius $R_0$. Thereupon, the increase of the toroidal field $B_t(R)$ at the plasma axis 23 causes the minor radics $a$ of column 13 to decrease to $a_1$, and the The following Table IV gives actual parameters of two examples of the Type-B compressor of FIG. 3.

TABLE IV.—TYPE-B COMPRESSOR EXAMPLES

| Example I | | Example II | | |
| --- | --- | --- | --- | --- |
| $R_0=80$ cm | $R_1=20$ cm | $R_0=120$ cm | $R_1=30$ cm., major radius of plasma. |
| $a_0=14$ cm | $a_1=7$ cm | $a_0=20$ cm | $a_1=10$ cm., minor radius of plasma. |
| $B_t(R_0)=20$ kg | $B_t(R_1)=80$ kg | $B_t(R_0)=25$ kg | $B_t(R_1)=100$ kg., toroidal field at initial plasma major radius $R_0$. |
| $I_0=75$ ka | $I_1=300$ ka | $I_0=140$ ka | $I_1=550$ ka., plasma current. |
| $n_0=2 \cdot 10^{13}$ cm.$^{-3}$ | $n_1=3 \cdot 10^{14}$ cm.$^{-3}$ | $n_0=2' 10^{13}$ cm.$^{-3}$ | $n_1=3 \cdot 10^{14}$ m.$^{-3}$, plasma density. |
| $T_{e0}=0.6$ kev | $T_{e1}=4$ kev | $T_{e0}=1$ kev | $T_{e1}=6$ kev., plasma electron temperature. |
| $T_{i0}=0.3$ kev | $T_{i1}=2$ kev | $T_{i0}=0.5$ kev | $T_{i1}=3$ kev., plasma ion temperature. |
| $\beta_{p0}=0.6$ | $\beta_{p1}=0.8$ | $\beta_{p0}$ | $\beta_{p1}=0.7$, ratio of plasma pressure to poloidal magnetic field pressure. |
| $W_{mag\ 0}=5$ mj | $\Delta W_{mag} < 30$ kj | $W_{mag\ 0}=25$ mj | $\Delta W_{mag} < 100$ kj. |

[1] Poloidal field energy change.

poloidal magnetic field $B_p(R)$ at the plasma axis causes the distance of column 13 from major axis 25 to decrease, thus correspondingly to decrease the radius $R_0$ of endless axis 23 to a correspondingly smaller vaule $R_1$ as shown in FIGS. 1 and 2c. This results in an effective system for stably confining and heating the plasma 37 in column 13.

From a comparison of the apparatus of FIG. 1 with an apparatus that leaves R fixed and varies only $a$, the latter requires a very large increase in $W_{mag}$ to effect a small increase in $n$ and T. Secondly, and more basically, since the aspect ratio is reduced, the $\beta_p$ factor rises just as rapidly as T. Thus, if the $\beta_p$ of the discharge stage is limited by stability considerations, then the compression merely drives the plasma into the unstable regime and does not improve the parameters at all.

Figure 3:
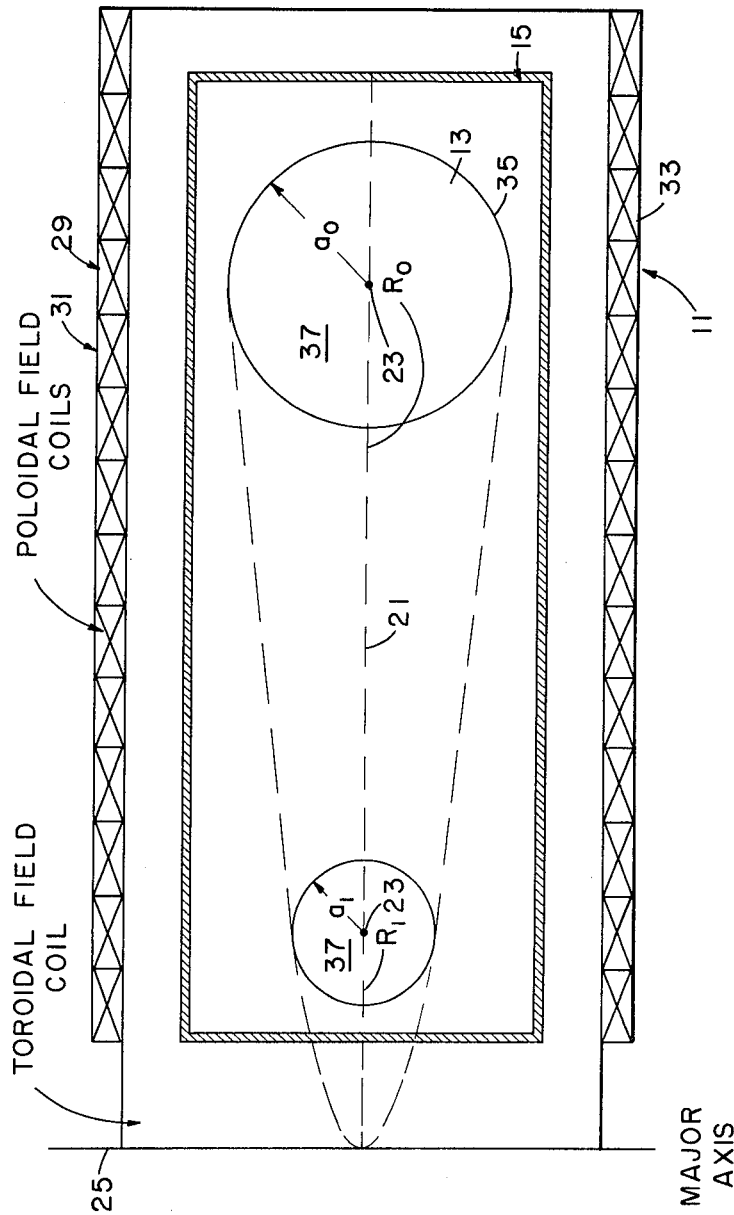
FIG. 3 is a partial cross section of another embodiment of this invention for compressing the plasma column of FIG. 1.

Referring now to FIG. 3, in another embodiment, the type-B compressor of this invention, comprises poloidal field producing means 29 having uniformly spaced coils 31 and 33 on opposite sides of toroidal vacuum container 15, which is fitted inside the toroidal field coil 27, which has the same major axis 25 shown in FIG. 1.

The operation of the embodiment of FIG. 3 is analogous to the operation of the embodiment of FIG. 1 described above, and shown in FIGS. 2a through 2c. Thus, an initial discharge in coils 31 and 33 produces an initial plasma current in plasma 37 that heats the plasma 37 all along endless axis 23 of plasma column 13. The coils 31 and 33 additionally provide the proper average $B_p$ field, shown in FIGS. 2a through 2c, thus to control the major plasma radius R.

The current $I_{tor}$ in the toroidal field coil 27, and the strength of the toroidal magnetic field $B_t$ at a fixed point do not need to be increased in this type-B compression, and therefore it is unnecessary to supply such large pulsed magnetic energy as in the Type-A compression.

The following Table III gives the scaling for the compressor B of FIG. 3 for a single slow compression:

TABLE III

Tpye-B compressor scaling $R \rightarrow C^{-1}$
$a \rightarrow C^{-1/2}$
$V \rightarrow C^{-2}$
$p \rightarrow C^{10/3}$
$n \rightarrow C^2$
$T \rightarrow C^{4/3}$
$B_t(R_0) = $ Const.
$B_t(R) \rightarrow C$
$I_{tor} = $ Const.
$\beta_p \rightarrow C^{4/3}$
$I \rightarrow C$
$\beta_p \rightarrow C^{4/3}$
$\beta_t \rightarrow C^{4/3}$
$W_{mag} = $ Const.
$W_{plasma} = C^{4/3}$
$l = $ Const.
$a/R \rightarrow C^{1/2}$ In review of the common features of the above described operations and embodiments for compression of the plasma column 13, a relatively low plasma density is used during the initial phase, thus permitting anomalous resistivity, and, nevertheless, a very high density in the final stage. Also, discharge heating by conventional ohmic heating in accordance with this invention is used up to $T_e \sim 1$ kev. where it is relatively fast, and where it easily overcomes energy losses due to atomic processes. Beyond this stage, compression heating is used, which is particularly useful for directly heating the ions during the compression stage, rather than through the electrons. Additionally, the cooling effects of the heretofore known plasma contamination can be overridden by the relatively rapid compression heating. Furthermore, it is not necessary to reach $T_e \gtrsim T_i$ in the final stage, since the ions are heated independently. Indeed, it is contemplated in accordance with this example, that the electrons cool to $T_e \leq T_i$, thereby increasing the ion pressure for a given plasma $\beta_p$. Finally, the compression in accordance with the above is such as to take the initial plasma current away from a conventional aperture limiter, thus reducing impurities, and maintaining the initial current distribution while increasing the field strength, thus avoiding skin current problems.

This invention has the advantage of providing high temperature plasmas by compression. Moreover, this invention provides a stabilized, high density, toroidal plasma column that is heated to high temperatures by compression. In this regard, this invention heats the plasma to higher temperatures than those that can be produced by ohmic or resistive heating, since this invention is not limited to a resistive plasma column. Thus, this invention provides high density plasmas and high ion temperatures of interest for controlled thermonuclear reactions.

What is claimed is:

1. Apparatus for confining a plasma current containing toroidal plasma column having a minor radius $a$ and a major radius R around a major axis, comprising means consisting of a series of annular toroidal and poloidal coils centered on said major axis defining an elongated cross-section for confining and compressing said toroidal plasma column in stages along an endless axis normal to said major axis, and means forming an elongated toroidal confinement container centered on said major axis for evacuating the elongated cross-section of said coils for effecting the compression of said plasma column in said major and minor radii in accordance with the limiting of the outside circumference of said plasma column cross-section on the inside of said container to a position where the endless axis thereof and said major radius are in a plane while said coils provide for the maintenance of a desired aspect ratio $a/R$ of said minor and major radii in said container.

2. The apparatus of claim 1 in which said container forms a tokamak having a rectangular cross-section for evacuating a rectangular cross-section in the elongated toroidal coil while said toroidal coil fills the annulus at the center of said container.

3. The apparatus of claim 1 in which said apparatus forms a toamak having straight top and bottom sides that are directed to a straight side spaced from and parallel to said major axis for locating said coils to fill the area at the center of the annulus formed by said toroidal container.

4. A method for increasing the aspect ratio $a/R$ in a plasma column having major and minor radii $a$ and $R$ and a plasma current along an endless axis in a plane around a major axis at right angles to said plane, comprising confining and compressing said plasma in toroidal and poloidal magnetic fields around said plasma column for providing a plasma current that interacts with said magnetic fields for effecting the adiabatic compression of said plasma column in both its major and minor radii while centering and stably confining the plasma column in an elongated cross-section toroidal container in accordance with said interaction whereby said plasma column is heated to a high temperature above that produced by said plasma current, and maintaining said toroidal field constant for increasing the aspect ratio of $a/R$ during said compression.

5. The method in which a plasma column having a plasma current and relatively large major and minor radii is confined in a first stage at a first location adjacent the outside diameter of an elongated cross-section toroidal container by toroidal and poloidal magnetic fields, said plasma column is thereafter confined in a second stage with relatively compressed major and minor radii at a second location adjacent the inner diameter of said elongated cross-section toroidal container by said toroidal and poloidal magnetic fields, and said toroidal magnetic field is increased to provide a constant aspect ratio between said radii during the interval of said second stage.

6. Plasma heating apparatus for use with a tokamak source of a plasma current carrying toroidal plasma column having a minor radius $a$ and a major radius R around a major axis normal to said major radius R, comprising an elongated, annular, toroidal confinement container forming an elongated cross-section toroidal aperture around an annulus centered on said major axis for containing and transporting said plasma column in successive stages in said aperture along said major radius R, and means consisting of a system of poloidal coils having a toroidal magnetic field coil that fills said annulus for producing magnetic fields that interact with said plasma column in said aperture for effecting the compression of said plasma column along said minor radius and the centering and compression of said plasma column in said aperture along said major radius R in a direction toward the portion of said toroidal magnetic field coil that fills said annulus in accordance with a desired aspect ratio $a/R$, whereby said plasma column is heated by said compression.

References Cited
UNITED STATES PATENTS

| | | | |
|---|---|---|---|
| 3,219,534 | 11/1965 | Furth | 176—3 |
| 3,230,145 | 1/1966 | Furth et al. | 176—3 |
| 3,508,104 | 4/1970 | Braams | 176—3 |

OTHER REFERENCES

Controlled Thermonuclear Reactions by L. A. Artsimovich. Gordon and Breach Science Publishers, N.Y. 1964, pp. 228–229.

REUBEN EPSTEIN, Primary Examiner

U.S. Cl. X.R.

315—111